United States Patent
Chen et al.

(10) Patent No.: US 9,380,567 B2
(45) Date of Patent: Jun. 28, 2016

(54) SEARCH SPACE DESIGN FOR RELAY PHYSICAL DOWNLINK CONTROL CHANNEL (R-PDCCH)

(75) Inventors: Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 884 days.

(21) Appl. No.: 13/210,102

(22) Filed: Aug. 15, 2011

(65) Prior Publication Data

US 2012/0039283 A1    Feb. 16, 2012

Related U.S. Application Data

(60) Provisional application No. 61/374,207, filed on Aug. 16, 2010.

(51) Int. Cl.
| | |
|---|---|
| H04W 72/04 | (2009.01) |
| H04L 5/00 | (2006.01) |
| H04B 7/26 | (2006.01) |
| H04L 1/00 | (2006.01) |
| H04W 84/04 | (2009.01) |

(52) U.S. Cl.
CPC ........... *H04W 72/042* (2013.01); *H04L 5/0053* (2013.01); *H04B 7/2606* (2013.01); *H04L 1/0038* (2013.01); *H04W 84/047* (2013.01)

(58) Field of Classification Search
CPC ............. H04W 84/047; H04W 72/042; H04L 5/0053; H04L 1/0038; H04B 7/2606
USPC .......................................... 370/310, 328, 329
See application file for complete search history.

(56) References Cited

U.S. PATENT DOCUMENTS

2011/0038327 A1* 2/2011 Moon ........................... 370/329
2011/0222491 A1* 9/2011 Vajapeyam et al. .......... 370/329

(Continued)

FOREIGN PATENT DOCUMENTS

CN      101568128 A    10/2009
WO      WO-2010055996 A1    5/2010

(Continued)

OTHER PUBLICATIONS

CMCC: "Un R-PDCCh Design", 3GPP Draft, R1-104118 Un R-PDCCH Design V1, 3RD Generation Partnership Project (3GPP), Mobile Competence Centre, 650, Route Des Lucioles, F-06921 Sophia-Antipolis Cedex, France, vol. RAN WG1, no. Dresden, Germany, 20100628, Jun. 24, 2010, XP050449522, [retrieved on Jun. 24, 2010].

(Continued)

*Primary Examiner* — Chi H Pham
*Assistant Examiner* — Robert Lopata
(74) *Attorney, Agent, or Firm* — Patterson & Sheridan, LLP

(57) ABSTRACT

Certain aspects of the present disclosure provide methods and apparatus for designing, generating, and monitoring the search space for control information for a node, such as a relay node (RN). This control information may comprise a Relay Physical Downlink Control Channel (R-PDCCH). The search space design may use contiguous, but physically distributed transmission resource units (e.g., physical resource blocks (PRBs)) to increase frequency diversity or frequency selectivity. For certain aspects, pairs of transmission resource units spanning two adjacent slots may have the same virtual resource block (VRB) index.

54 Claims, 9 Drawing Sheets

(56) References Cited

U.S. PATENT DOCUMENTS

| | | | |
|---|---|---|---|
| 2011/0243059 A1* | 10/2011 | Liu et al. | 370/315 |
| 2011/0317610 A1* | 12/2011 | Park et al. | 370/312 |
| 2012/0093063 A1* | 4/2012 | Yuan et al. | 370/315 |
| 2012/0099519 A1* | 4/2012 | Kim et al. | 370/315 |
| 2012/0113884 A1* | 5/2012 | Park et al. | 370/312 |
| 2012/0128039 A1* | 5/2012 | Kim et al. | 375/211 |
| 2012/0140726 A1* | 6/2012 | Moon et al. | 370/329 |
| 2012/0218964 A1* | 8/2012 | Park et al. | 370/329 |
| 2013/0010685 A1* | 1/2013 | Kim et al. | 370/315 |
| 2013/0034070 A1* | 2/2013 | Seo et al. | 370/329 |
| 2013/0064099 A1* | 3/2013 | Kim et al. | 370/241 |

FOREIGN PATENT DOCUMENTS

| | | |
|---|---|---|
| WO | 2010074530 A2 | 7/2010 |
| WO | WO2010074536 A2 | 7/2010 |

OTHER PUBLICATIONS

International Search Report and Written Opinion—PCT/US2011/047969—ISA/EPO—Dec. 19, 2011.

LG Electronics Inc: "Consideration on R-PDCCH CCE and REG for interleaving", 3GPP Draft, R1-103738, 3RD Generation Partnership Project (3GPP), Mobile Competence Centre, 650, Route Des Lucioles, F-06921 Sophia-Anti Polis Cedex, France, vol. RAN WG1, no. Dresden, Germany, 20100628, Jun. 22, 2010, XP050449169, [retrieved on Jun. 22, 2010].

NEC Group: "R-PDCCH blind decoding for Frequency Diversity and Frequency Selective R-PDCCH transmissions", 3GPP Draft, R1-103834 R-PDCCH Blind Decoings for FS and FD R-PDCCH Transmissions, 3RD Generation Partnership Project (3GPP), Mobile Competence Centre, 650, Route Des Lucioles, F-06921 Sophia-Anti. Polis Cedex, France, vol. RAN WG1, no. Dresden, Germany, 20100628, Jun. 22, 2010, XP050449252, [retrieved on Jun. 22, 2010].

Panasonic: "R-PDCCH placement", 3GPP Draft; R1-102042, 3RD Generation Partnership Project (3GPP), Mobile Competence Centre, 650, Route Des Lucioles, F-06921 Sophia-Anti Polis Cedex, France, vol. RAN WG1, no. Beijing; 20100412, 6 Apr. 1, 2010 (Apr. 6, 2010), XP050419373, [retrieved on Apr. 6, 2010].

Qualcomm Incorporated: "DM-RS for R-PDCCH", 3GPP Draft; R1-102345 DM-RS for R-PDCCH, 3RD Generation Partnership Project (3GPP), Mobile Competence Centre; 650, Route Des Lucioles; F-06921 Sophia-Antipolis Cedex; France, vol. RAN WGI, no. Beijing, china; 20100412, Apr. 6, 2010, XP050419574, [retrieved on Apr. 6, 2010].

Samsung: "R-PDCCH design", 3GPP Draft, R1-102218, 3RD Generation Partnership Project (3GPP), Mobile Competence Centre, 650, Route Des Lucioles, F-06921 Sophia-Antipolis Cedex, France, vol. RAN WG1, no. Beijing, china, 20100412, Apr. 6, 2010, XP050419487, [retrieved on Apr. 6, 2010].

LG Electronics: "R-PDCCH interleaving alternatives", 3GPP TSG-RAN WG1#61b, R1103736, Jun. 28, 2010, pp. 1-6, URL: http://www.3gpp.org/ftp/tsg_ran/WG1_RL1/TSGR1_61b/Docs/R1-103736.zip.

Huawei, "Performance evaluation of CRS based R-PDCCH", 3GPP TSG-RAN WG1# 61b R1-103883 <URL:http://www.3gpp.org/ftp/tsg_ran/WG1_RL1/TSGR1_61b/Docs/R1-103883.zip>, Jun. 21, 2010.

* cited by examiner

SEARCH SPACE DESIGN FOR RELAY PHYSICAL DOWNLINK CONTROL CHANNEL (R-PDCCH)

CROSS-REFERENCE TO RELATED APPLICATION(S)

This application claims benefit of U.S. Provisional Patent Application Ser. No. 61/374,207, filed Aug. 16, 2010, which is herein incorporated by reference.

BACKGROUND

1. Field

Certain aspects of the disclosure generally relate to wireless communications and, more particularly, to search space for the Relay Physical Downlink Control Channel (R-PDCCH).

2. Background

Wireless communication systems are widely deployed to provide various types of communication services such as voice, video, packet data, messaging, broadcast, etc. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, single-carrier FDMA (SC-FDMA) networks, $3^{rd}$ Generation Partnership Project (3GPP) Long Term Evolution (LTE) networks, and Long Term Evolution Advanced (LTE-A) networks.

A wireless communication network may include a number of base stations that can support communication with a number of user equipment devices (UEs). A UE may communicate with a base station via the downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE. This communication link may be established via a single-input single-output, multiple-input single-output or a multiple-input multiple-output (MIMO) system.

Wireless communication systems may comprise a donor base station that communicates with wireless terminals via a relay node, such as a relay base station. The relay node may communicate with the donor base station via a backhaul link and with the terminals via an access link. In other words, the relay node may receive downlink messages from the donor base station over the backhaul link and relay these messages to the terminals over the access link. Similarly, the relay node may receive uplink messages from the terminals over the access link and relay these messages to the donor base station over the backhaul link. The relay node may, thus, be used to supplement a coverage area and help fill "coverage holes."

SUMMARY

Certain aspects of the present disclosure generally relate to designing, generating, and monitoring the search space for control information for a node, such as a relay node (RN). This control information may comprise a Relay Physical Downlink Control Channel (R-PDCCH).

In an aspect of the disclosure, a method for wireless communications is provided. The method generally includes allocating a first sequence of transmission resource units for conveying control information for a node, wherein the first sequence is contiguous; rearranging the first sequence of transmission resource units to form a second sequence of transmission resource units, wherein individual transmission resource units from the first sequence are physically distributed in the second sequence after the rearranging; and transmitting the control information for the node using at least a portion of the second sequence of transmission resource units.

In an aspect of the disclosure, an apparatus for wireless communications is provided. The apparatus generally includes a processing system and a transmitter. The processing system is typically configured to allocate a first sequence of transmission resource units for conveying control information for a node, wherein the first sequence is contiguous; and to rearrange the first sequence of transmission resource units to form a second sequence of transmission resource units, wherein individual transmission resource units from the first sequence are physically distributed in the second sequence after the rearranging. The transmitter is generally configured to transmit the control information for the node using at least a portion of the second sequence of transmission resource units.

In an aspect of the disclosure, an apparatus for wireless communications is provided. The apparatus generally includes means for allocating a first sequence of transmission resource units for conveying control information for a node, wherein the first sequence is contiguous; means for rearranging the first sequence of transmission resource units to form a second sequence of transmission resource units, wherein individual transmission resource units from the first sequence are physically distributed in the second sequence after the rearranging; and means for transmitting the control information for the node using at least a portion of the second sequence of transmission resource units.

In an aspect of the disclosure, a computer-program product for wireless communications is provided. The computer-program product generally includes a computer-readable medium having code for allocating a first sequence of transmission resource units for conveying control information for a node, wherein the first sequence is contiguous; for rearranging the first sequence of transmission resource units to form a second sequence of transmission resource units, wherein individual transmission resource units from the first sequence are physically distributed in the second sequence after the rearranging; and for transmitting the control information for the node using at least a portion of the second sequence of transmission resource units.

In an aspect of the disclosure, a method for wireless communications is provided. The method generally includes receiving a first sequence of transmission resource units allocated for control information for a node, wherein the first sequence of transmission resource units has been rearranged from at least a portion of a second sequence of transmission resource units, wherein the second sequence was contiguous, and wherein individual transmission resource units from the second sequence are physically distributed in the first sequence as received; determining the control information from the first sequence of transmission resource units; and locating data based on the control information.

In an aspect of the disclosure, an apparatus for wireless communications is provided. The apparatus generally includes a receiver and a processing system. The receiver is typically configured to receive a first sequence of transmission resource units allocated for control information for the apparatus, wherein the first sequence of transmission resource units has been rearranged from at least a portion of a second sequence of transmission resource units, wherein the second sequence was contiguous, and wherein individual transmission resource units from the second sequence are physically distributed in the first sequence as received. The processing system is generally configured to determine the control information from the first sequence of transmission resource units and to locate data based on the control information.

In an aspect of the disclosure, an apparatus for wireless communications is provided. The apparatus generally includes means for receiving a first sequence of transmission resource units allocated for control information for the apparatus, wherein the first sequence of transmission resource units has been rearranged from at least a portion of a second sequence of transmission resource units, wherein the second sequence was contiguous, and wherein individual transmission resource units from the second sequence are physically distributed in the first sequence as received; means for determining the control information from the first sequence of transmission resource units; and means for locating data based on the control information.

In an aspect of the disclosure, a computer-program product for wireless communications is provided. The computer-program product generally includes a computer-readable medium having code for receiving a first sequence of transmission resource units allocated for control information for a node, wherein the first sequence of transmission resource units has been rearranged from at least a portion of a second sequence of transmission resource units, wherein the second sequence was contiguous, and wherein individual transmission resource units from the second sequence are physically distributed in the first sequence as received; for determining the control information from the first sequence of transmission resource units; and for locating data based on the control information.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

An Example Wireless Communication System

Figure 1:
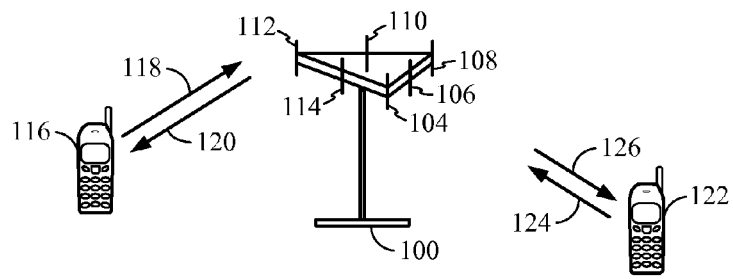
FIG. 1 illustrates an example wireless communication system according to an aspect of the present disclosure.

Referring to FIG. 1, a multiple access wireless communication system according to one embodiment is illustrated. Access point 100 (AP) includes multiple antenna groups, one including antenna 104 and antenna 106, another including antenna 108 and antenna 110, and yet another including antenna 112 and antenna 114. In FIG. 1, only two antennas are shown for each antenna group; however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect, antenna groups each are designed to communicate to access terminals in a sector, of the areas covered by access point 100.

In communication over forward links 120 and 126, the transmitting antennas of access point 100 utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point (AP) may be a fixed station used for communicating with the terminals and may also be referred to as a base station (BS), a Node B, or some other terminology. An access terminal may also be called a mobile station (MS), user equipment (UE), a wireless communication device, terminal, user terminal (UT), or some other terminology.

Figure 2:
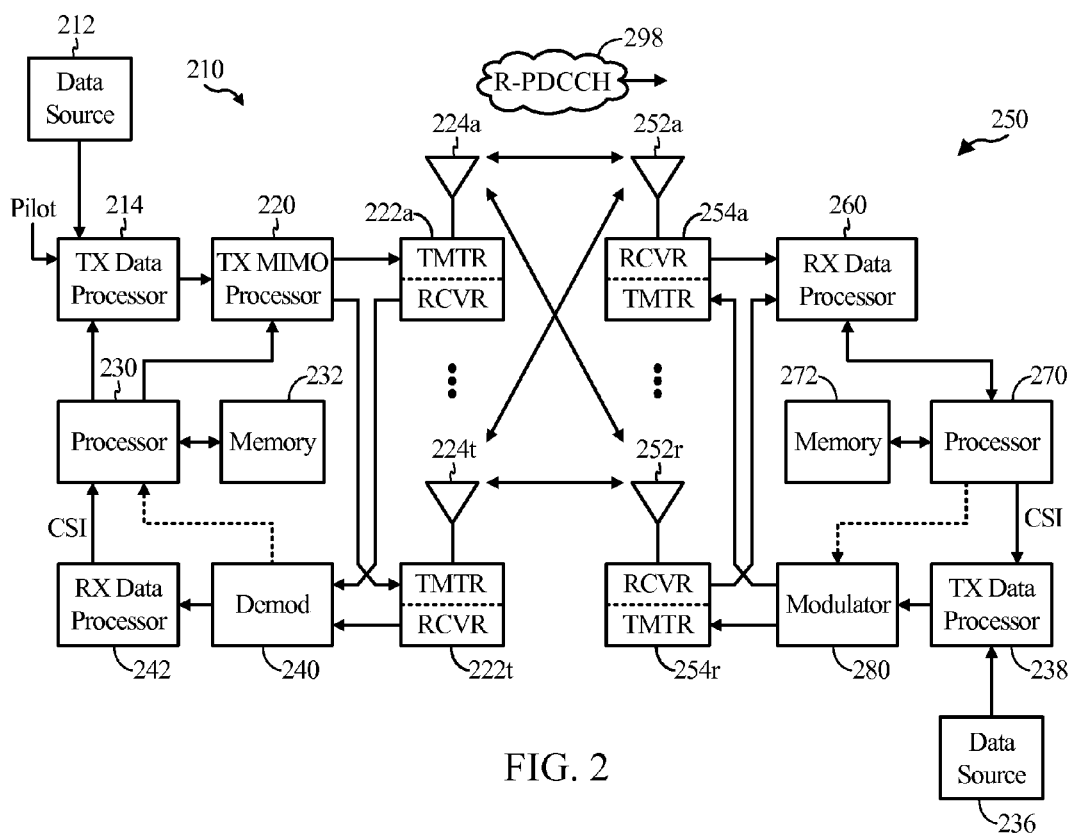
FIG. 2 is a block diagram conceptually illustrating an example of a Node B in communication with a user equipment device (UE) in a wireless communication system, according to an aspect of the present disclosure.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively. The transmitted modulated signals may indicate control information for a relay node, such as a Relay Physical Downlink Control Channel (R-PDCCH) 298, as illustrated in FIG. 2.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

In an aspect, logical channels are classified into Control Channels and Traffic Channels. Logical Control Channels comprise Broadcast Control Channel (BCCH), which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+ MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations apply:

| | |
|---|---|
| AM | Acknowledged Mode |
| AMD | Acknowledged Mode Data |
| ARQ | Automatic Repeat Request |
| BCCH | Broadcast Control CHannel |
| BCH | Broadcast CHannel |
| C- | Control- |
| CCCH | Common Control CHannel |
| CCH | Control CHannel |
| CCTrCH | Coded Composite Transport Channel |
| CP | Cyclic Prefix |
| CRC | Cyclic Redundancy Check |
| CTCH | Common Traffic CHannel |
| DCCH | Dedicated Control CHannel |
| DCH | Dedicated CHannel |
| DL | DownLink |
| DL-SCH | DownLink Shared CHannel |
| DM-RS | DeModulation-Reference Signal |
| DSCH | Downlink Shared CHannel |
| DTCH | Dedicated Traffic CHannel |
| FACH | Forward link Access CHannel |
| FDD | Frequency Division Duplex |
| L1 | Layer 1 (physical layer) |
| L2 | Layer 2 (data link layer) |
| L3 | Layer 3 (network layer) |
| LI | Length Indicator |
| LSB | Least Significant Bit |
| MAC | Medium Access Control |
| MBMS | Multimedia Broadcast Multicast Service |
| MCCH | MBMS point-to-multipoint Control CHannel |
| MRW | Move Receiving Window |
| MSB | Most Significant Bit |
| MSCH | MBMS point-to-multipoint Scheduling CHannel |
| MTCH | MBMS point-to-multipoint Traffic CHannel |
| PCCH | Paging Control CHannel |
| PCH | Paging CHannel |
| PDU | Protocol Data Unit |
| PHY | PHYsical layer |
| PhyCH | Physical CHannels |
| RACH | Random Access CHannel |
| RB | Resource Block |
| RLC | Radio Link Control |

-continued

| | |
|---|---|
| RRC | Radio Resource Control |
| SAP | Service Access Point |
| SDU | Service Data Unit |
| SHCCH | SHared channel Control CHannel |
| SN | Sequence Number |
| SUFI | SUper FIeld |
| TCH | Traffic CHannel |
| TDD | Time Division Duplex |
| TFI | Transport Format Indicator |
| TM | Transparent Mode |
| TMD | Transparent Mode Data |
| TTI | Transmission Time Interval |
| U- | User- |
| UE | User Equipment |
| UL | UpLink |
| UM | Unacknowledged Mode |
| UMD | Unacknowledged Mode Data |
| UMTS | Universal Mobile Telecommunications System |
| UTRA | UMTS Terrestrial Radio Access |
| UTRAN | UMTS Terrestrial Radio Access Network |
| MBSFN | Multimedia Broadcast Single Frequency Network |
| MCE | MBMS Coordinating Entity |
| MCH | Multicast CHannel |
| MSCH | MBMS Control CHannel |
| PDCCH | Physical Downlink Control CHannel |
| PDSCH | Physical Downlink Shared CHannel |
| PRB | Physical Resource Block |
| VRB | Virtual Resource Block |

In addition, Rel-8 refers to Release 8 of the LTE standard.

An Example Relay System

Figure 3:
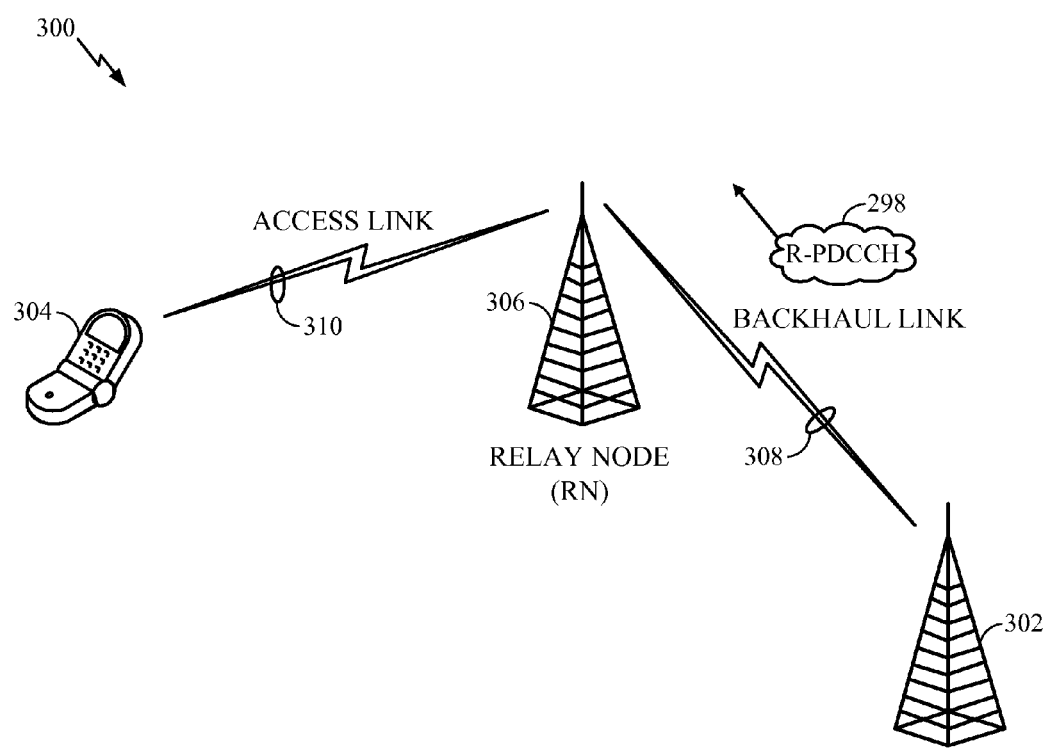
FIG. 3 illustrates an example wireless communications system with a relay node according to an aspect of the present disclosure.

FIG. 3 illustrates an example wireless system 300 in which certain aspects of the present disclosure may be practiced. As illustrated, the system 300 includes a donor base station (BS) 302 (also known as donor access point or a donor evolved Node B (DeNB)) that communicates with a user equipment (UE) 304 via a relay node 306 (also known as a relay station or a relay).

The relay node 306 may communicate with the donor BS 302 via a backhaul link 308 and with the UE 304 via an access link 310. In other words, the relay node 306 may receive downlink messages from the donor BS 302 over the backhaul link 308 and relay these messages to the UE 304 over the access link 310. Similarly, the relay node 306 may receive uplink messages from the UE 304 over the access link 310 and relay these messages to the donor BS 302 over the backhaul link 308.

The relay node 306 may, thus, be used to supplement a coverage area and help fill "coverage holes." According to certain aspects, a relay node 306 may appear to a UE 304 as a conventional BS. According to other aspects, certain types of UEs may recognize a relay node as such, which may enable certain features.

Example Search Space Design for Relay PDCCH

A relay node 306 may not be able to receive normal PDCCH from a donor BS 302. In this case, the donor BS may transmit a Relay Physical Downlink Control Channel (R-PDCCH) 298 via the backhaul link 308. The R-PDCCH 298 may be transmitted in a Multimedia Broadcast Single Frequency Network (MBSFN) subframe or a non-MBSFN subframe from the donor BS. The R-PDCCH is designed to dynamically or semi-persistently assign resources for the downlink backhaul data (e.g., Physical Downlink Shared Channel (PDSCH) for a relay node (R-PDSCH) and Physical Uplink Shared Channel (PUSCH) for a relay node (R-PUSCH)).

Figure 4:
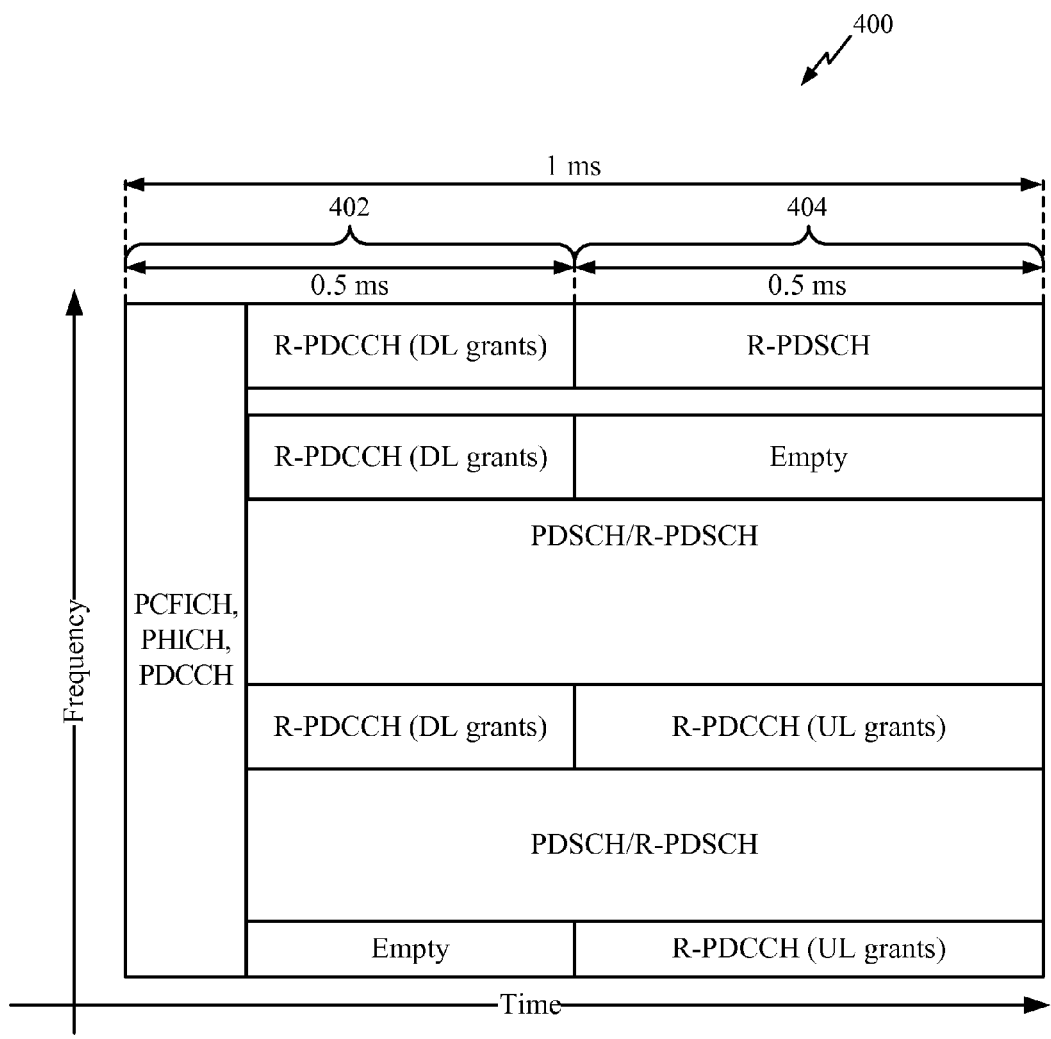
FIG. 4 illustrates an example Relay Physical Downlink Control Channel (R-PDCCH) subframe according to an aspect of the present disclosure.

FIG. 4 illustrates an example backhaul subframe 400 according to an aspect of the present disclosure. The backhaul subframe 400 is divided into a first slot 402 and a second slot 404, wherein each slot comprises 7 symbols in LTE for the normal cyclic prefix (CP) case. Each subframe in LTE spans 1 ms, and therefore, each slot has a duration of 0.5 ms. The first 3 symbols of the backhaul subframe 400 may be used for the Physical Control Format Indicator Channel (PCFICH), the Physical HARQ Indicator Channel (PHICH), and the normal (i.e., non-relay) PDCCH.

Various options are available for conveying information in the backhaul subframe 400. For example, DL grants are transmitted in the first slot 402. If a DL grant is transmitted in the first physical resource block (PRB) of a given PRB pair, then a UL grant may be transmitted in the second PRB of the PRB pair for certain aspects. For other aspects, data (e.g., R-PDSCH data) may be transmitted in the second slot 404 of a R-PDCCH PRB pair, or the second slot 404 may be empty.

One issue regarding R-PDCCH involves the search space design for R-PDCCH. In LTE Rel-8, PDCCH demodulation is based on common reference signals (CRSs). Each UE monitors two types of search spaces: common and UE-specific. As a result, up to 22 PDCCH decoding candidates may be possible. For each PDCCH decoding candidate, there are two distinct Downlink Control Information (DCI) sizes resulting in a maximum of 44 blind decodes. Each PDCCH may be transmitted using a specific aggregation level, where Control Channel Elements (CCEs) (comprising 9 resource element groups (REGs), which is equal to 36 REs) may be the minimum unit.

For the common search space, two aggregation levels may be supported, for example, 4 (CCEs) and 8, with 4 and 2 decoding candidates, respectively. For the UE-specific search space, four aggregation levels may be supported, for example, 1, 2, 4, and 8, with 6, 6, 2, and 2 decoding candidates, respectively. Each search space may follow the so-called "tree-structure," where the starting CCE for each aggregation level may be an integer multiple of the corresponding level.

According to certain aspects, both CRS-based and DM-RS (Demodulation Reference Signal)-based R-PDCCH demodulation may be supported. For DM-RS-based R-PDCCH demodulation, the DL grant and UL grant in a Physical Resource Block (PRB) pair may be for the same relay node (RN). In other words, no REs in such a PRB pair can be used for a different RN. On the other hand, for CRS-based R-PDCCH demodulation, two interleaving modes may be supported: (1) Rel-8-type REG-level interleaving and (2) no interleaving across R-PDCCHs within a PRB.

It may be determined that fallback operation based on DCI format 1A with CRS may be indicated for relay backhaul operation. In one aspect, at least one non-MBSFN subframe may be configured as part of the DL backhaul subframes at the donor BS in an effort to facilitate the fallback operation. That is, the same LTE Rel-8 transmit diversity scheme may be applied to PDSCH transmissions corresponding to DCI format 1A, which can be used in the non-MBSFN subframe from the donor BS.

Preferably, the same LTE Rel-8 search space design may be maintained as much as possible. As an example, both common and RN-specific search spaces may be supported (common search space may only be present in the first slot), such that tree-structure-based search space may be maintained. As another example, only RN-specific search space may be supported. A maximum number of R-PDCCH blind decodes may be kept similar to that of an LTE Rel-10 UE: e.g., aggregation levels 4 and 8, with up to 4 and 2 decoding candidates, respectively, in the common search space, and aggregation levels 1, 2, 4, and 8, with up to 6, 6, 2, and 2 decoding candidates, respectively, in the RN-specific search space.

For REG-level-based R-PDCCH interleaving, the same REG definition and CCE definition may be applied, where the REs available for R-PDCCH may potentially discount the REs for CRS and CSI-RS (Channel State Information Reference Signal).

When there is no interleaving across different R-PDCCHs in a PRB, it may not be possible to maintain the same CCE size (36 REs), due to the static split of DL and UL grants at the slot boundary, the presence of CRS/DM-RS/CSI-RS, etc. For simplicity, it may be reasonable to define each PRB as one CCE from the search space design perspective. As an example, for CRS-based R-PDCCH, considering the presence of CRS and CSI-RS, the minimum number of R-PDCCH REs per PRB is 4*12−4−8=36 for DL grants (4 symbols available in the first slot 402 not used by PDFICH, PHICH, or PDCCH and 12 subcarriers in a PRB), and 7*12−3*4−8=64 (7 symbols available in the second slot 404 and 12 subcarriers in a PRB), where an S-port CSI-RS is assumed and there are no muted REs for other signals (e.g., CSI-RS of neighboring cells). For DM-RS-based R-PDCCH, the number may be further reduced, due to the presence of DM-RS REs, to 24 and 52, respectively.

For REG-level interleaving, the same or similar REG and CCE definitions as in LTE Rel-8 may be adopted. For the case of no REG-level interleaving, the CCE numbering may be simply based on the frequency of the R-PDCCH virtual resource blocks (VRBs), starting from the lowest frequency. The mapping from VRB to PRB may be similar to that of PDSCH. In particular, similar mapping of virtual resource blocks of distributed type defined for PDSCH may be used for CRS-based R-PDCCH. However, instead of mapping to different PRBs over the two slots, the same VRB index should be mapped to the same PRB pair (i.e., no slot hopping). Both localized and distributed R-PDCCH resource reservation schemes may be supported. It may be up to the DeNB to choose the appropriate R-PDCCH resource reservation scheme for frequency diverse or frequency selective benefits.

Figure 5:
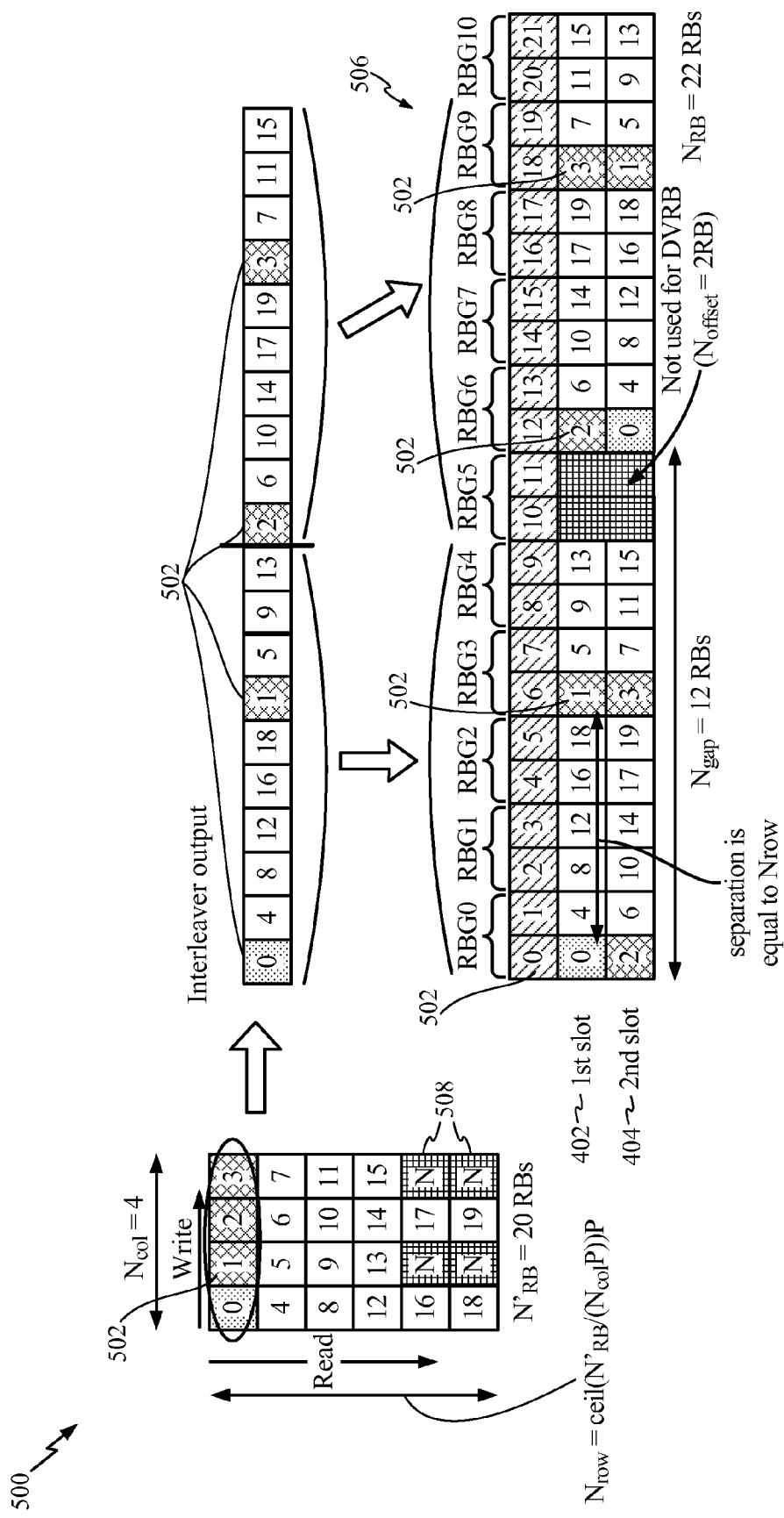
FIG. 5 illustrates an example mapping of logical resource blocks to physical resource blocks (PRBs), which are physically distributed in frequency according to an aspect of the present disclosure.

FIG. 5 illustrates distributed resource allocation in accordance with certain aspects of the present disclosure. As illustrated in the logical resource grid 500 (e.g., a VRB matrix) associated with a resource block group (RBG) size of P=2, the resource blocks (RBs) 502 allocated for R-PDCCH may be contiguous logically according to the VRB index when written across the rows of the grid 500. A number ($N_{null}$) of nulls 508 may be inserted in the last $N_{null}/2$ rows of the $2^{nd}$ and $4^{th}$ column of the grid 500 to complete the grid when the number of downlink VRBs ($N'_{RB}$=20) is less than the number of rows ($N_{row}$=6) multiplied by the number of columns ($N_{col}$=4). This first sequence of RBs may have resource block indices 0, 1, 2, 3, 4, . . . . However, the RBs 502 as mapped to PRBs in a backhaul subframe 506 with first and second slots 402, 404 are non-contiguous (i.e., are physically distributed), as illustrated. After this mapping, this second sequence of RBs may have resource block indices 0, 4, 8, 12, 16, . . . . Furthermore, certain RBs 908 (illustratively, RB10 and RB11) may not be addressed in distributed resource allocation for a physical shared data channel of a UE. According to certain aspects, a location of the RBs for the control channel may be centered around these RBs.

Figure 6:
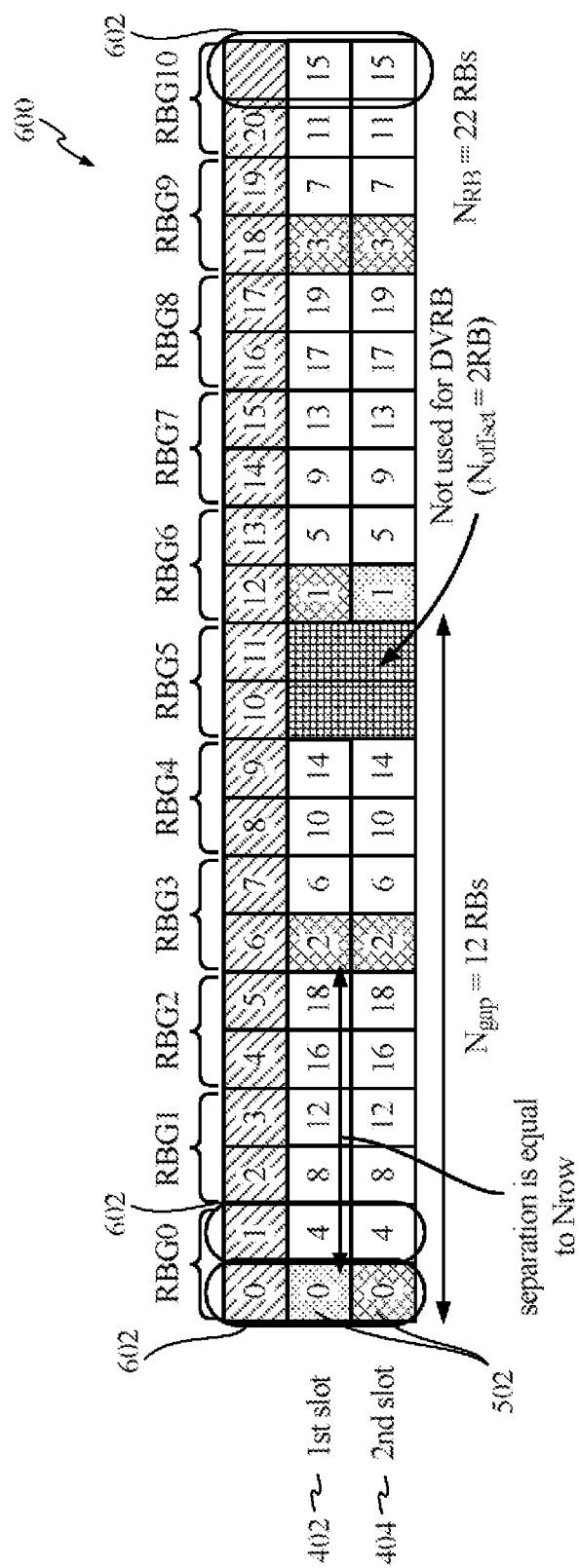
FIG. 6 illustrates another example mapping of logical resource blocks to PRBs, wherein pairs of PRBs in two different slots have the same virtual resource block (VRB) index, according to an aspect of the present disclosure.

FIG. 6 illustrates another example mapping of logical resource blocks to PRBs, wherein members of each pair 602 of PRBs in the first and second slots 402, 404 of a backhaul subframe 600 have the same VRB index, according to an aspect of the present disclosure. In other words, both RBs in the first and second slots 402, 404 have the same VRB index.

Other definitions of VRB-to-PRB mapping are also possible, for example, to generally increase frequency diversity or frequency selectivity.

As in LTE Rel-8, common search space may start from the first CCE, while RN-specific search space may be derived based on the number of available CCEs, RN ID, the aggregation level, subframe index, and the predetermined random seeds. The same RN-specific search space design may be applied to DL and UL grants.

When there are a very small number of relays, the number of PRB pairs reserved for R-PDCCH may be significantly less than 8, such that it may be difficult or impossible to support aggregation level 8. If the number of PRB pairs for R-PDCCH is less than 4, effectively there may not be any common search space. However, this is not an issue and may be up to eNB implementation. This is because in such a scenario, the difference in transmission efficiency between broadcast and unicast may be very small.

Certain aspects presented herein provide details of example R-PDCCH search space designs. The same or similar design as in LTE Rel-8 may be maintained with minimal specification and implementation impact. In particular, the following aspects have been provided herein. Both common and RN-specific search spaces may be supported, with common search space present in the first slot and the same RN-specific search space design may be applied to DL and UL grants. Tree-structure-based search space may also be maintained. For CRS-based R-PDCCH, the same LTE Rel-8 REG and CCE definitions may be adopted. For the case of no REG-level R-PDCCH interleaving, each PRB may be treated as one CCE, and the CCE may be numbered based on the frequency of the R-PDCCH VRBs, starting from the lowest frequency. The mapping from VRB to PRB may be similar to that for PDSCH, where the same VRB index should be mapped to the same PRB pair (i.e., no slot hopping). The maximum number of R-PDCCH blind decodes may also be similar to that of an LTE Rel-10 UE. For example, common search space aggregation levels 4 and 8, with up to 4 and 2 decoding candidates, respectively, may be supported. RN-specific search space aggregation levels 1, 2, 4, and 8, with up to 6, 6, 2, and 2 decoding candidates, respectively, may also be supported.

Figure 7:
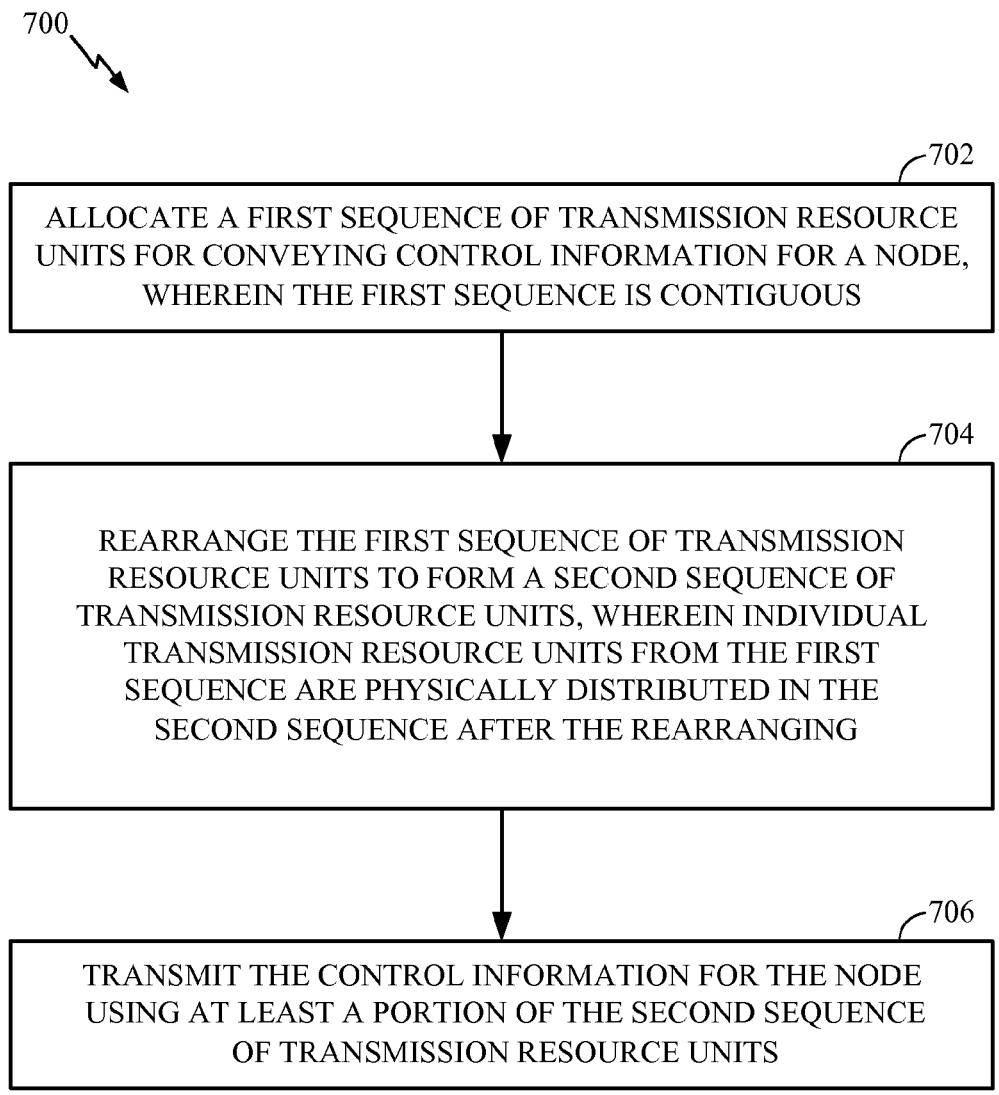
FIG. 7 is a flow diagram of example operations for transmitting control information for a node using a reorganized sequence of transmission resource units, according to an aspect of the present disclosure.

FIG. 7 is a flow diagram of example operations 700 for transmitting control information for a node using a reorganized sequence of transmission resource units, according to an aspect of the present disclosure. The control information for the node may comprise R-PDCCH, which may be CRS-based or RN-specific-reference-signal-based. The operations 700 may be performed by a donor eNB (DeNB), for example. The node may comprise a relay node, such as a half-duplex relay node.

The operations may begin, at 702, by allocating a first sequence of transmission resource units for conveying control information for a node. The first sequence of transmission resource units may be contiguous (e.g., logically or in frequency). The transmission resource units may comprise PRBs, and each of the PRBs may be considered as one CCE.

At 704, the first sequence of transmission resource units may be rearranged to form a second sequence of transmission resource units, as illustrated in FIG. 5 or 6, for example. Individual transmission resource units from the first sequence may be physically distributed (in frequency) in the second sequence after the rearranging at 704. The rearranging may correspond to a mapping scheme for frequency-distributed data and may increase frequency diversity or frequency selectivity.

For certain aspects, the first sequence may comprise one or more pairs of transmission resource units. In this case, the rearranging may comprise rearranging the first sequence to form the second sequence wherein, for each pair of transmission resource units in the second sequence, a first member of the pair has the same sequence index as a second member of the pair. The sequence index may comprise a virtual resource block (VRB) index, as illustrated in FIG. 6. For certain aspects, the first member of at least one pair of transmission resource units may comprise an assignment of downlink (DL) resources, and the second member of the at least one pair of transmission resource units may comprise a grant of uplink (UL) resources.

At 706, the control information for the node may be transmitted using at least a portion (e.g., a subset) of the second sequence of transmission resource units.

Figure 7A:
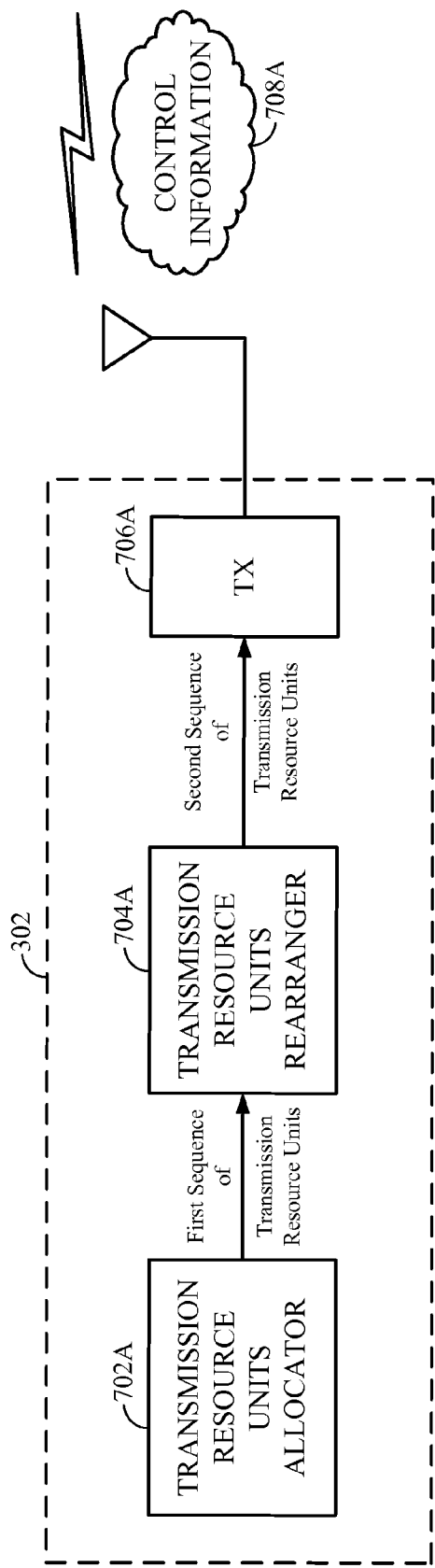
FIG. 7A illustrates example components capable of performing the operations illustrated in FIG. 7.

The operations 700 described above may be performed by any suitable components or other means capable of performing the corresponding functions of FIG. 7. For example, operations 700 illustrated in FIG. 7 correspond to components 700A illustrated in FIG. 7A. In FIG. 7A, a transmission resource units allocator 702A may allocate a first sequence of transmission resource units for conveying control information. A transmission resource unit rearranger 704A may rearrange the first sequence of transmission resource units to form a second sequence of transmission resource units, as described above. A transmitter 706A (or a transceiver) may transmit the control information for the node using at least a portion of the second sequence of transmission resource units.

Figure 8:
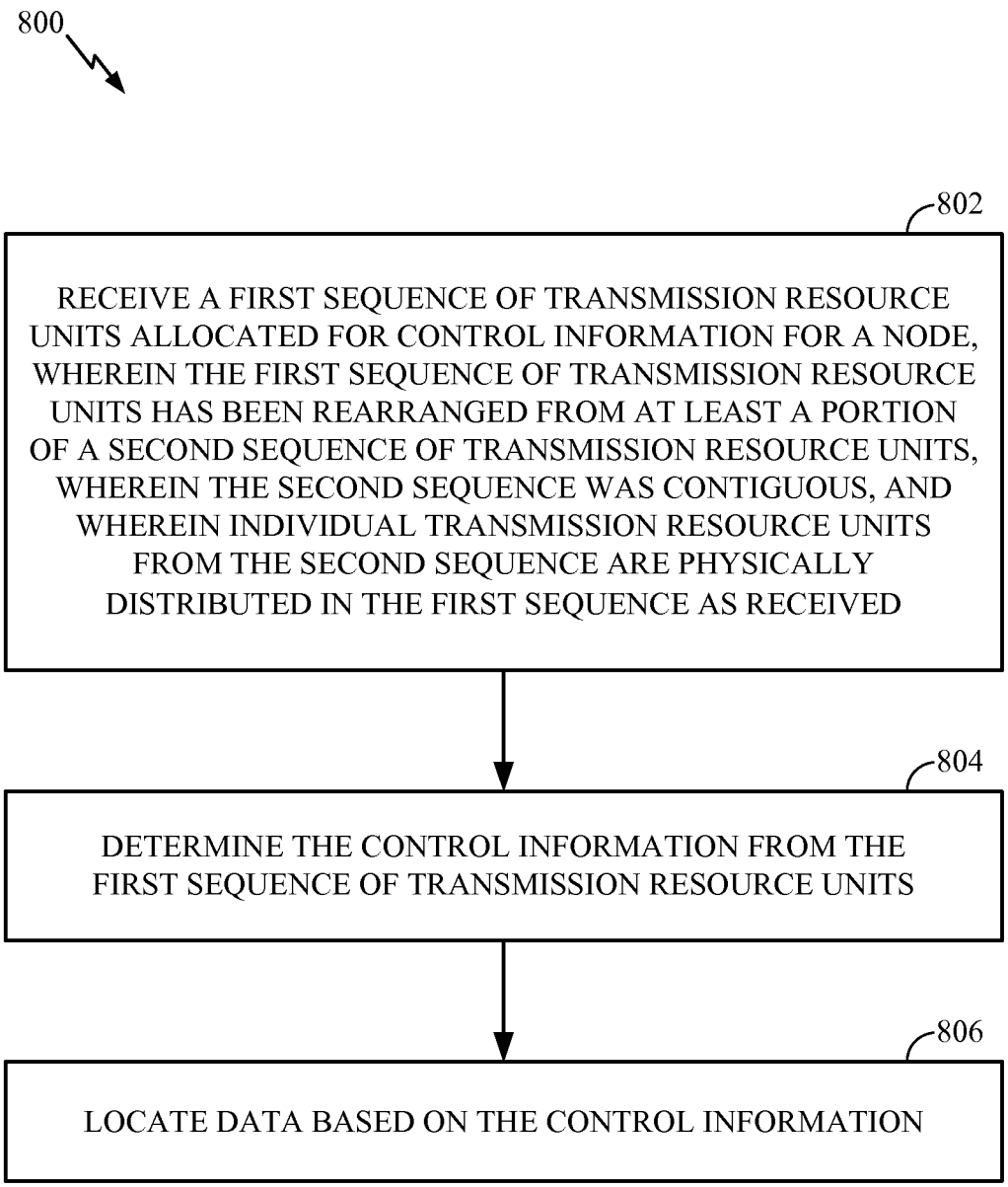
FIG. 8 is a flow diagram of example operations for determining control information for a node from a reorganized sequence of transmission resource units, according to an aspect of the present disclosure.

FIG. 8 is a flow diagram of example operations 800 for determining control information for a node from a reorganized sequence of transmission resource units, according to an aspect of the present disclosure. The operations 800 may be performed by the node. The node may comprise a relay node, such as a half-duplex relay node.

The operations 800 may begin, at 802, by receiving a first sequence of transmission resource units allocated for control information for a node. The first sequence of transmission resource units may have been rearranged from at least a portion of a second sequence of transmission resource units, wherein the second sequence was contiguous (e.g., logically or in frequency). The individual transmission units from the second sequence may be physically distributed (in frequency) in the first sequence as received at 802. The control information for the node may comprise R-PDCCH, which may be CRS-based or node-specific-reference-signal-based R-PDCCH. The transmission resource units may comprise PRBs, and each of the PRBs may be considered as one CCE.

According to certain aspects, the first sequence may comprise one or more pairs of transmission resource units, and for each pair of transmission resource units in the first sequence, a first member of the pair may have the same sequence index as a second member of the pair. The sequence index may comprise a VRB index. For certain aspects, the first member of at least one pair of transmission resource units may comprise an assignment of downlink (DL) resources, and the second member of the at least one pair of transmission resource units may comprise a grant of uplink (UL) resources. The operations 800 may further comprise determining a grant of UL resources from the second member of at least one pair of transmission resource units and transmitting UL data according to the grant of the UL resources.

At 804, the control information for the node may be determined from the first sequence of transmission resource units. The control information may be determined using at least one of different decoding candidates and different format sizes.

For certain aspects, the control information for the node may be determined using 1, 2, 4, or 8 CCEs with two different downlink control information (DCI) format sizes.

At 806, data (e.g., (R)-PDSCH data) may be located based on the control information. For certain aspects, downlink (DL) data may be located in the same subframe in which the control information was received or in a subsequent subframe.

Figure 8A:
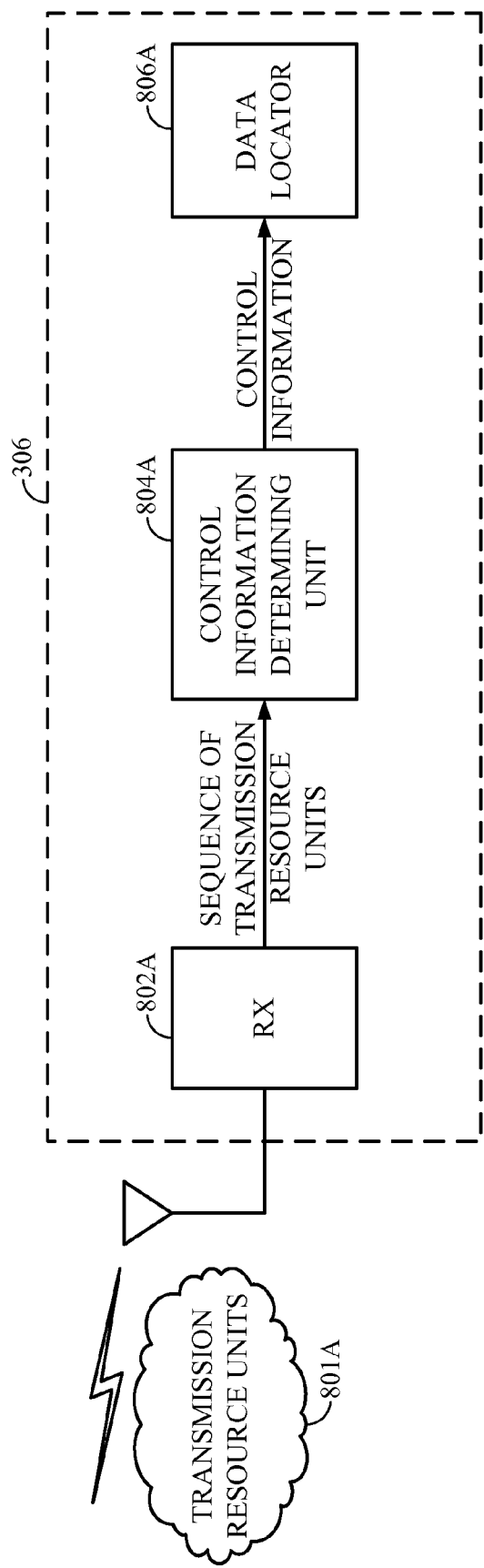
FIG. 8A illustrates example components capable of performing the operations illustrated in FIG. 8.

The operations 800 described above may be performed by any suitable components or other means capable of performing the corresponding functions of FIG. 8. For example, operations 800 illustrated in FIG. 8 correspond to components 800A illustrated in FIG. 8A. In FIG. 8A, a receiver 802A (or a transceiver) may receive a sequence of transmission resource units 801A. A control information determining unit 804A may determine control information based on the sequence of transmission resource units. A data locator 806A may locate data based on the control information received from the control information determining unit 804A.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in the figures, those operations may have corresponding counterpart means-plus-function components with similar numbering.

For example, means for transmitting may comprise a transmitter (e.g., a transmitter 222) and/or an antenna 224 of the transmitter system 210 or a transmitter (e.g., a transmitter 254) and/or an antenna 252 of the receiver system 250 illustrated in FIG. 2. Means for receiving may comprise a receiver (e.g., a receiver 254) and/or an antenna 252 of the receiver system 250 or a receiver (e.g., a receiver 222) and/or an antenna 224 of the transmitter system 210 illustrated in FIG. 2. Means for processing, means for determining, means for allocating, means for rearranging, or means for locating may comprise a processing system, which may include at least one processor, such as the RX data processor 260, the processor 270, and/or the TX data processor 238 of the receiver system 250 or the RX data processor 242, the processor 230, and/or the TX data processor 214 of the transmitter system 210 illustrated in FIG. 2.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:

allocating a first sequence of transmission resource units for conveying control information for a node, wherein the first sequence is contiguous;

rearranging the first sequence of transmission resource units to form a second sequence of transmission resource units, wherein individual transmission resource units from the first sequence are physically distributed in the second sequence after the rearranging, wherein the first sequence and the second sequence comprise one or more pairs of transmission resource units, and wherein, for each pair of transmission resource units in the second sequence, a first member of the pair has the same sequence index as a second member of the pair; and transmitting the control information for the node using at least a portion of the second sequence of transmission resource units.

2. The method of claim 1, wherein the control information for the node comprises a relay physical downlink control channel (R-PDCCH).

3. The method of claim 2, wherein the R-PDCCH comprises a common reference signal (CRS)-based R-PDCCH.

4. The method of claim 2, wherein the R-PDCCH comprises a node-specific-reference-signal-based R-PDCCH.

5. The method of claim 1, wherein the transmission resource units comprise physical resource blocks (PRBs).

6. The method of claim 5, wherein each of the PRBs is considered as one control channel element (CCE).

7. The method of claim 6, wherein the control information for the node comprises 1, 2, 4, or 8 CCEs.

8. The method of claim 1, wherein the rearranging corresponds to a mapping scheme for frequency distributed data.

9. The method of claim 1, wherein the rearranging increases frequency diversity or frequency selectivity.

10. The method of claim 1, wherein the sequence index comprises a virtual resource block (VRB) index.

11. The method of claim 1, wherein the first member of at least one pair of transmission resource units comprises an assignment of downlink (DL) resources and wherein the second member of the at least one pair of transmission resource units comprises a grant of uplink (UL) resources.

12. The method of claim 1, wherein the node is a half-duplex relay node.

13. An apparatus for wireless communications, comprising:
a processing system configured to:
allocate a first sequence of transmission resource units for conveying control information for a node, wherein the first sequence is contiguous; and
rearrange the first sequence of transmission resource units to form a second sequence of transmission resource units, wherein individual transmission resource units from the first sequence are physically distributed in the second sequence after the rearranging, wherein the first sequence and the second sequence comprise one or more pairs of transmission resource units, and wherein, for each pair of transmission resource units in the second sequence, a first member of the pair has the same sequence index as a second member of the pair; and
a transmitter configured to transmit the control information for the node using at least a portion of the second sequence of transmission resource units.

14. The apparatus of claim 13, wherein the control information for the node comprises a relay physical downlink control channel (R-PDCCH).

15. The apparatus of claim 14, wherein the R-PDCCH comprises a common reference signal (CRS)-based R-PDCCH.

16. The apparatus of claim 14, wherein the R-PDCCH comprises a node-specific-reference-signal-based R-PDCCH.

17. The apparatus of claim 13, wherein the transmission resource units comprise physical resource blocks (PRBs).

18. The apparatus of claim 17, wherein each of the PRBs is considered as one control channel element (CCE).

19. The apparatus of claim 18, wherein the control information for the node comprises 1, 2, 4, or 8 CCEs.

20. The apparatus of claim 13, wherein the rearranging corresponds to a mapping scheme for frequency distributed data.

21. The apparatus of claim 13, wherein the rearranging increases frequency diversity or frequency selectivity.

22. The apparatus of claim 13, wherein the sequence index comprises a virtual resource block (VRB) index.

23. The apparatus of claim 13, wherein the first member of at least one pair of transmission resource units comprises an assignment of downlink (DL) resources and wherein the second member of the at least one pair of transmission resource units comprises a grant of uplink (UL) resources.

24. The apparatus of claim 13, wherein the node is a half-duplex relay node.

25. An apparatus for wireless communications, comprising:
means for allocating a first sequence of transmission resource units for conveying control information for a node, wherein the first sequence is contiguous;
means for rearranging the first sequence of transmission resource units to form a second sequence of transmission resource units, wherein individual transmission resource units from the first sequence are physically distributed in the second sequence after the rearranging, wherein the first sequence and the second sequence comprise one or more pairs of transmission resource units, and wherein, for each pair of transmission resource units in the second sequence, a first member of the pair has the same sequence index as a second member of the pair; and
means for transmitting the control information for the node using at least a portion of the second sequence of transmission resource units.

26. A computer-program product for wireless communications, the computer-program product comprising:
a non-transitory computer-readable medium comprising code for:
allocating a first sequence of transmission resource units for conveying control information for a node, wherein the first sequence is contiguous;
rearranging the first sequence of transmission resource units to form a second sequence of transmission resource units, wherein individual transmission resource units from the first sequence are physically distributed in the second sequence after the rearranging, wherein the first sequence and the second sequence comprise one or more pairs of transmission resource units, and wherein, for each pair of transmission resource units in the second sequence, a first member of the pair has the same sequence index as a second member of the pair; and
transmitting the control information for the node using at least a portion of the second sequence of transmission resource units.

27. A method for wireless communications, comprising:
receiving a first sequence of transmission resource units allocated for control information for a node, wherein the first sequence of transmission resource units has been rearranged from at least a portion of a second sequence of transmission resource units, wherein the second sequence was contiguous, and wherein individual transmission resource units from the second sequence are physically distributed in the first sequence as received, wherein the first sequence and the second sequence comprise one or more pairs of transmission resource units, and wherein, for each pair of transmission resource units in the second sequence, a first member of the pair has the same sequence index as a second member of the pair;

determining the control information from the first sequence of transmission resource units; and locating data based on the control information.

28. The method of claim 27, wherein the control information for the node comprises a relay physical downlink control channel (R-PDCCH).

29. The method of claim 28, wherein the R-PDCCH comprises a common reference signal (CRS)-based R-PDCCH.

30. The method of claim 28, wherein the R-PDCCH comprises a node-specific-reference-signal-based R-PDCCH.

31. The method of claim 27, wherein the transmission resource units comprise physical resource blocks (PRBs).

32. The method of claim 31, wherein each of the PRBs is considered as one control channel element (CCE).

33. The method of claim 32, wherein the determining comprises determining the control information for the node using 1, 2, 4, or 8 CCEs with two different downlink control information (DCI) format sizes.

34. The method of claim 27, wherein the sequence index comprises a virtual resource block (VRB) index.

35. The method of claim 27, wherein the first member of at least one pair of transmission resource units comprises an assignment of downlink (DL) resources and wherein the second member of the at least one pair of transmission resource units comprises a grant of uplink (UL) resources.

36. The method of claim 27, further comprising:

determining a grant of uplink (UL) resources from the second member of at least one pair of transmission resource units; and transmitting UL data according to the grant of the UL resources.

37. The method of claim 27, wherein the node is a half-duplex relay node.

38. The method of claim 27, wherein determining the control information comprises determining the control information using at least one of different decoding candidates and different format sizes.

39. The method of claim 27, wherein locating the data comprises locating downlink (DL) data in the same subframe in which the control information was received or in a subsequent subframe.

40. An apparatus for wireless communications, comprising:

a receiver configured to receive a first sequence of transmission resource units allocated for control information for the apparatus, wherein the first sequence of transmission resource units has been rearranged from at least a portion of a second sequence of transmission resource units, wherein the second sequence was contiguous, and wherein individual transmission resource units from the second sequence are physically distributed in the first sequence as received, wherein the first sequence and the second sequence comprise one or more pairs of transmission resource units, and wherein, for each pair of transmission resource units in the second sequence, a first member of the pair has the same sequence index as a second member of the pair; and a processing system configured to:

determine the control information from the first sequence of transmission resource units; and locate data based on the control information.

41. The apparatus of claim 40, wherein the control information for the apparatus comprises a relay physical downlink control channel (R-PDCCH).

42. The apparatus of claim 41, wherein the R-PDCCH comprises a common reference signal (CRS)-based R-PDCCH.

43. The apparatus of claim 41, wherein the R-PDCCH comprises a node-specific-reference-signal-based R-PDCCH.

44. The apparatus of claim 40, wherein the transmission resource units comprise physical resource blocks (PRBs).

45. The apparatus of claim 44, wherein each of the PRBs is considered as one control channel element (CCE).

46. The apparatus of claim 45, wherein the processing system is configured to determine the control information for the apparatus using 1, 2, 4, or 8 CCEs with two different downlink control information (DCI) format sizes.

47. The apparatus of claim 40, wherein the sequence index comprises a virtual resource block (VRB) index.

48. The apparatus of claim 40, wherein the first member of at least one pair of transmission resource units comprises an assignment of downlink (DL) resources and wherein the second member of the at least one pair of transmission resource units comprises a grant of uplink (UL) resources.

49. The apparatus of claim 40, further comprising a transmitter, wherein the processing system is configured to determine a grant of uplink (UL) resources from the second member of at least one pair of transmission resource units and wherein the transmitter is configured to transmit UL data according to the grant of the UL resources.

50. The apparatus of claim 40, wherein the apparatus is a half-duplex relay node.

51. The apparatus of claim 40, wherein the processing system is configured to determine the control information using at least one of different decoding candidates and different format sizes.

52. The apparatus of claim 40, wherein the processing system is configured to locate the data by locating downlink (DL) data in the same subframe in which the control information was received or in a subsequent subframe.

53. An apparatus for wireless communications, comprising:

means for receiving a first sequence of transmission resource units allocated for control information for the apparatus, wherein the first sequence of transmission resource units has been rearranged from at least a portion of a second sequence of transmission resource units, wherein the second sequence was contiguous, and wherein individual transmission resource units from the second sequence are physically distributed in the first sequence as received, wherein the first sequence and the second sequence comprise one or more pairs of transmission resource units, and wherein, for each pair of transmission resource units in the second sequence, a first member of the pair has the same sequence index as a second member of the pair;

means for determining the control information from the first sequence of transmission resource units; and means for locating data based on the control information.

54. A computer-program product for wireless communications, the computer-program product comprising:

a non-transitory computer-readable medium comprising code for:

receiving a first sequence of transmission resource units allocated for control information for a node, wherein the first sequence of transmission resource units has been rearranged from at least a portion of a second sequence of transmission resource units, wherein the second sequence was contiguous, and wherein individual transmission resource units from the second sequence are physically distributed in the first sequence as received, wherein the first sequence and the second sequence comprise one or more pairs of transmission resource units, and wherein, for each pair of transmission resource units in the second sequence, a first member of the pair has the same sequence index as a second member of the pair;
determining the control information from the first sequence of transmission resource units; and
locating data based on the control information.

* * * * *